United States Patent [19]

Banba et al.

[11] Patent Number: 4,911,029

[45] Date of Patent: Mar. 27, 1990

[54] SHOCK RESPONSIVE ACTUATOR

[75] Inventors: Sadahiko Banba, Sukagawa; Yoshio Muranaka, Toda, both of Japan

[73] Assignee: Koso International, Inc., Santa Fe Springs, Calif.

[21] Appl. No.: 272,530

[22] Filed: Nov. 17, 1988

[51] Int. Cl.[4] ............................................. F16K 17/36
[52] U.S. Cl. ................................... 74/2; 137/38; 251/66
[58] Field of Search .................... 74/2; 137/38, 45; 251/66; 200/61.45 R

[56] References Cited

U.S. PATENT DOCUMENTS

| 3,805,818 | 4/1974 | Yamada | 137/38 |
| 3,878,858 | 4/1975 | Yamada | 137/38 |
| 4,028,510 | 6/1977 | Yamaura et al. | 200/61.45 R |
| 4,091,831 | 5/1978 | Pazmang | 137/38 |
| 4,103,697 | 8/1978 | Kiesow | 137/45 |
| 4,185,507 | 1/1980 | Domyan . | |
| 4,475,565 | 10/1984 | Keller et al. . | |
| 4,503,717 | 3/1985 | Keller et al. . | |
| 4,513,629 | 4/1985 | Keller et al. . | |
| 4,603,591 | 8/1986 | Sibley et al. . | |

OTHER PUBLICATIONS

"Greer Fail Safe Actuators", Greer Rotary Actuator Division, Bulletin No. 8151, Reissued 4/1981.

*Primary Examiner*—James R. Brittain

*Attorney, Agent, or Firm*—William P. Green

[57] ABSTRACT

A shock responsive device for automatically actuating a valve or other controlled unit in response to earthquake forces, including a weight which is displaceable from a pedestal or other support by shock forces, an element at a first side of the support actuable by the weight to operate the controlled unit, and a guide structure onto which the weight can fall at a second side of the support and which is constructed to direct the weight from that side to the first side for actuation of the element and controlled unit. The guide structure preferably extends circularly about the support and is inclined to direct the weight by gravity to the first side of the support from any other location thereabout. The guide structure may be vertically movable relative to the support to return the weight to the normal position on the support for resetting of the mechanism. A spring urged operator member power actuates the controlled unit when released by displacement of the weight, and is manually operable to a cocked position by a mechanism preferably including a cocking element disposed about a rotary shaft which is adapted to be turned in one rotary direction by a coil spring type clutch located radially between the cocking element and the shaft. The coil spring may be actuable to an active condition by axial compression under the control of a manually operated part.

39 Claims, 6 Drawing Sheets

SHOCK RESPONSIVE ACTUATOR

This invention relates to shock responsive devices for automatically actuating a controlled unit such as a gas shut-off valve upon subjection to earthquake forces or other mechanical shock forces of predetermined magnitude.

BACKGROUND OF THE INVENTION

In areas in which earthquakes frequently occur, it is desirable that any line supplying natural gas to a building contain an automatic shut off valve for closing the gas supply line in response to earthquake forces, in order to minimize the possibility of a disastrous fire. Various types of actuators have been devised for this purpose, typically including an inertia actuated weight displaceable by shock forces in a manner operating or releasing a mechanism for closing the valve or attaining another desired safety purpose. One such device is shown in U.S. Pat. No. 4,185,507 issued Jan. 29, 1980 to Frank F. Domyan for "Acceleration Responsive Tripping Mechanism". In that device, a weight is supported on an upper surface of a pedestal, with a surrounding tube yieldingly urged upwardly and being actuable downwardly by the weight when the weight is displaced laterally by shock forces.

SUMMARY OF THE INVENTION

A major purpose of the present invention is to provide an earthquake responsive mechanism which is capable of controlling release of a spring force of very substantial magnitude, in order to operate a relatively large valve or other controlled unit. A device embodying the invention is capable of responding to shock forces acting in any horizontal direction relative to a support on which an inertia actuated weight is normally positioned, but functions to apply the force of the falling weight to a weight actuated element at only a predetermined localized area relative to the support, regardless of the direction of displacement of the weight. This localized force may then actuate a mechanism for releasing a spring urged valve operator in a very reliable manner assuring proper operation of the valve or other controlled unit when earthquake forces or the like are encountered.

To achieve the above results, the apparatus of the invention includes a guide structure onto which the inertia operated weight can fall at a side of the support, and which acts then to direct the weight by gravity from that side to another side at which a weight actuated element is located. Preferably, the guide structure extends entirely about the support, and is inclined to direct the weight by gravity to a predetermined side of the support from any other location about the support. The guide structure may be inclined to advance downwardly as it advances circularly, and also to advance downwardly as it advances radially inwardly, to hold the weight inwardly against the support in different positions of the weight. The guide structure is also desirably manually actuable upwardly relative to the support pedestal to return the actuated weight upwardly to the top of the pedestal for resetting of the mechanism after shock induced actuation thereof.

The valve closing spring force of the device may be applied against an axially movable rod, which is releasably latched in an open valve condition by a latch mechanism adapted to be released by downward movement of a weight actuated element. This element may upon downward movement be received between two arms of a clutch mechanism, to displace those two arms laterally apart and thus release them from holding engagement with the spring actuated rod.

The device may be cocked by rotation of a valve shaft against the resistance of the springs which urge the valve to closed position. Certain particular features of the invention relate to the provision of manual mechanism for rotating the last mentioned shaft to forcibly open the valve, with that mechanism including a cocking member disposed about the shaft and adapted to rotatively actuate the shaft by a coil spring type clutch interposed radially between the cocking element and the shaft. An operator can render that clutch effective to transmit cocking power to the shaft by operating a member which axially compresses the coil spring. Also, it is desirable that the cocking element be rotatable manually through a worm and worm gear drive which enables rotation of the cocking element and its valve operating shaft in a valve opening direction but automatically applies a braking force preventing unwanted reverse rotation of the parts.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
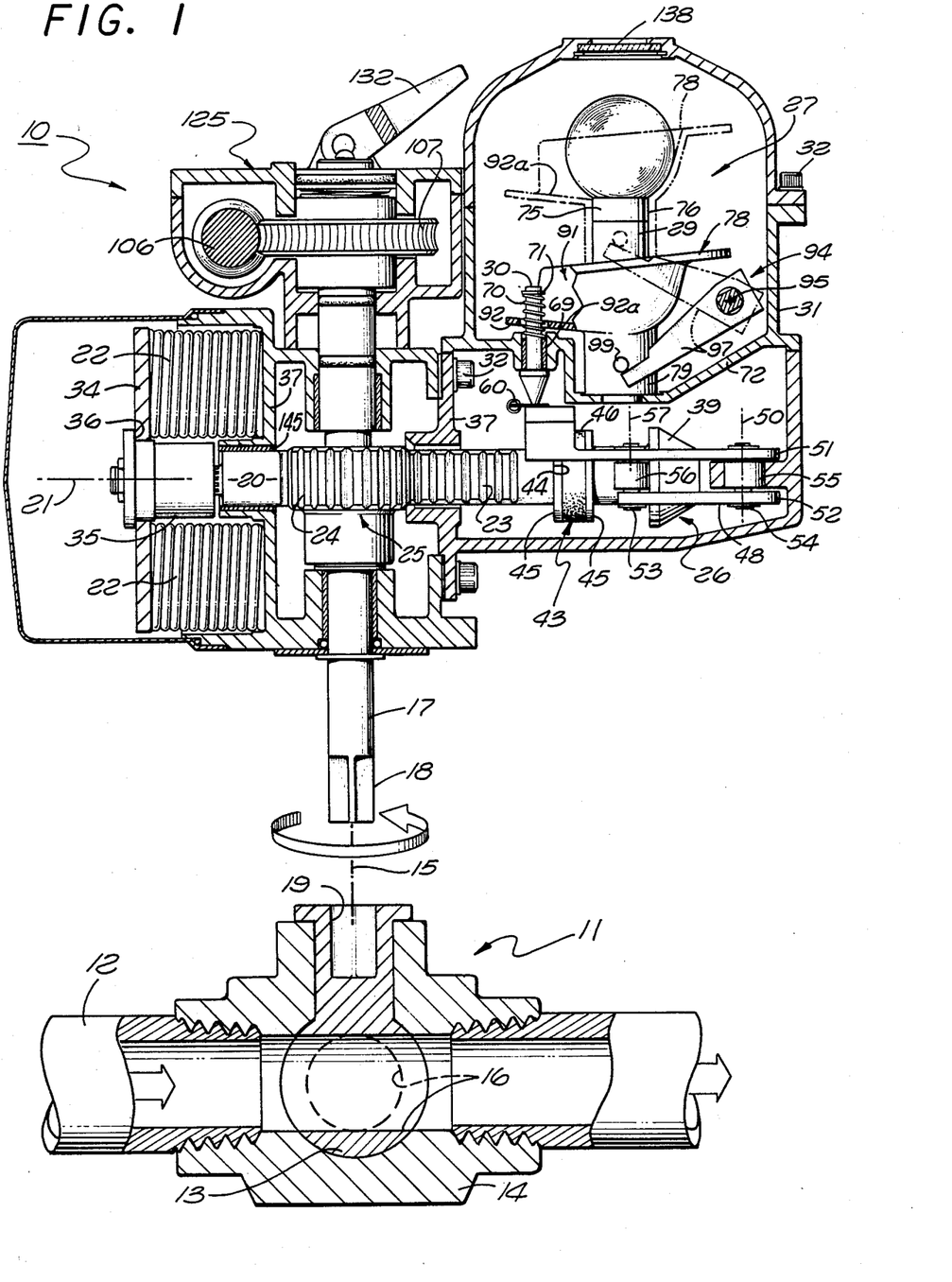
FIG. 1 is a vertical section through a device embodying the invention adapted for automatically closing a rotary valve upon subjection to earthquake forces or other shock forces of a predetermined magnitude.

In FIG. 1, there is illustrated at 10 an earthquake responsive actuator constructed in accordance with the invention and adapted for operating a conventional rotary valve illustrated somewhat diagrammatically at 11. This valve may be connected into a natural gas supply line 12 for closing off the flow of gas therethrough when the device 10 is actuated by earthquake forces. The valve 11 may be a conventional ball valve, having a spherical valve element 13 mounted within the housing 14 of the valve and adapted to be power rotated through ninety (90) degrees about a vertical axis 15 by the device 10. The spherical valve element 13 contains a passage 16 which in its 'open' rotary setting is aligned with the gas line 12 to allow a flow of gas through valve 11 from one of its sides to the other side. Upon rotation of ball valve element 13 through ninety (90) degrees from that open position, the passage 16 extends transversely of line 12 to block flow of gas through the valve (broken line position of FIG. 1).

The actuator 10 includes a shaft 17 which extends vertically along and is centered about axis 15, and has a lower portion 18 of non-circular horizontal section which engages a correspondingly non-circular mating part 19 of valve element 18 to transmit rotary motion about axis 15 thereto. Shaft 17 is yieldingly urged rotatively about axis 15 to a closed valve condition by a shaft 20 which extends and moves along a horizontal axis 21 and is urged leftwardly toward the position of FIG. 2 by a number of circularly spaced coil springs 22. Shaft 20 has a series of rack teeth 23 formed along one of its sides for engagement with mating teeth 24 of a gear 25 fixed to shaft 17, to convert linear motion of shaft 20 along axis 21 to rotary motion of shaft 17 about its vertical axis 15. A cocking mechanism 125 is manually rotatable to move shaft 20 rightwardly to its position of FIG. 1 for releasable retention in that open valve condition by a latch mechanism 26. A shock actuated assembly 27 includes a weight 28 preferably in the form of an externally spherical ball, and acts upon displacement of the ball from its support pedestal 29 to move an element 30 downwardly in a manner releasing the latch mechanism 26 for closure of valve 11. The entire mechanism is contained within a hollow housing structure 31 which may be formed of several sections secured together by bolts 32 as illustrated.

Shaft 20 is contained within a lower portion of housing 31, and is guided for the discussed longitudinal movement along axis 21 of the shaft by two bushings 145 mounted in two vertical internal walls 37 of the housing. At its left end as viewed in FIG. 1, shaft 20 has a reduced diameter portion 146 about which the shaft carries an annular member 147 retained on the shaft by a nut 148. Member 146 may have internal splines 149 engaging corresponding splines on the outer surface of the shaft to retain member 147 against rotation relative to the shaft. A transverse annular plate 34 is disposed about the outer cylindrical surface 35 of member 147, and bears leftwardly against a shoulder 36 on member 147 to transmit the force of springs 22 to member 147 and shaft 20. The springs 22 are under compression at all times, and bear leftwardly against plate 34 and rightwardly against one of the vertical walls 37 within housing 31. There may be four of the springs 22, centered about four individual axis 38 spaced circularly about axis 21 of shaft 20. It will thus be apparent that the springs 22 continually urge shaft 20 leftwardly toward the closed valve position of FIG. 2.

Figure 2:
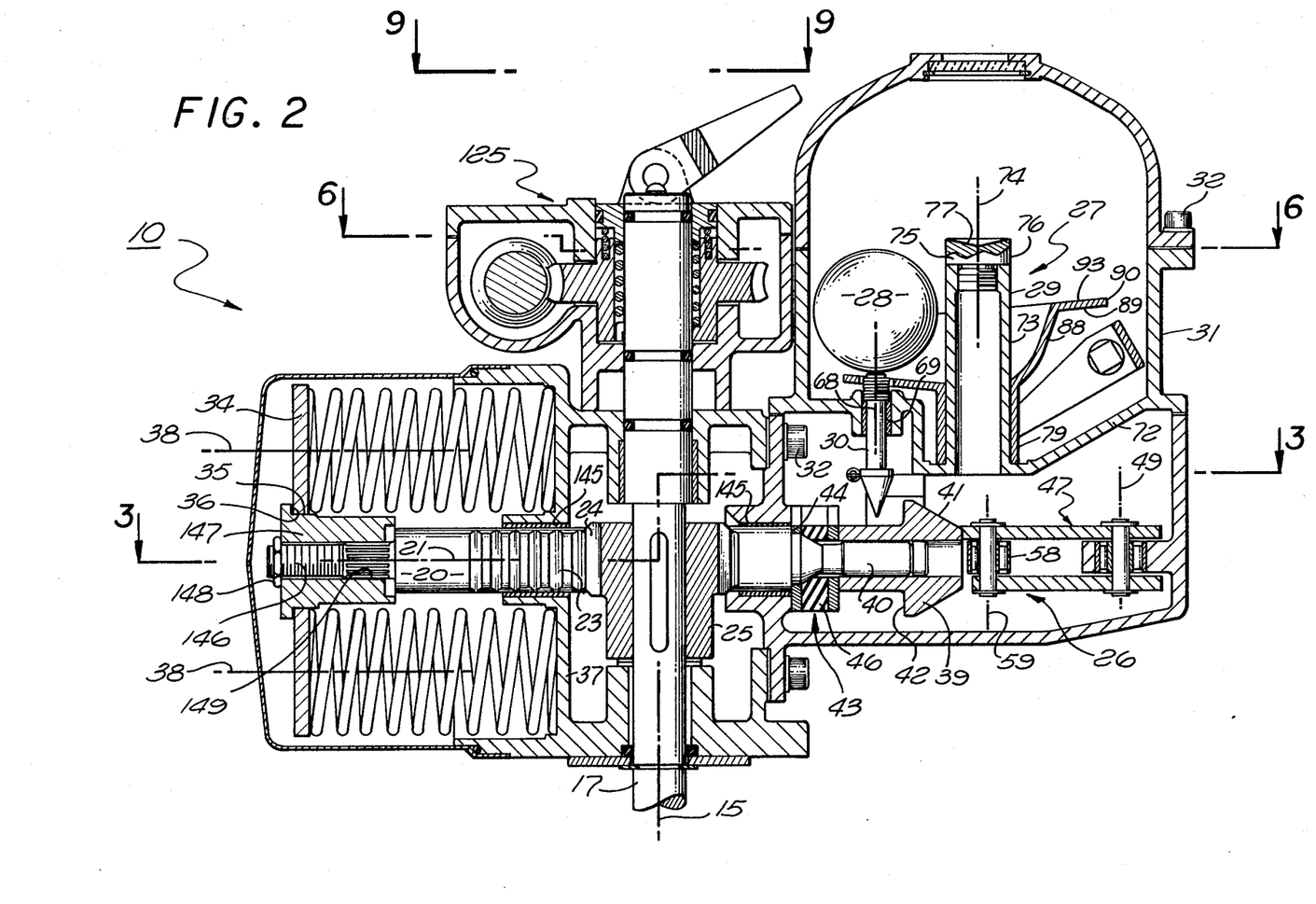
FIG. 2 is a view similar to FIG. 1 but showing the device in a closed valve condition, and showing some of the parts in section which are illustrated in elevation in FIG. 1.

At the right end of shaft 20 as viewed in FIGS. 1 and 2, an annular latch part 39 of the latch mechanism 26 is disposed about a reduced diameter portion 40 of the shaft and rigidly secured thereto in any convenient manner. Latch part 39 has a frustroconically tapering surface 41 at its right side and a transverse annular shoulder surface 42 at its left side, both extending about and centered about axis 21. When shaft 20 and its connected parts 147 and 39 are moved leftwardly by springs 22 to the position of FIG. 2, that leftward movement is halted and cushioned by an annular assembly 43 carried about the shaft between latch part 39 and a rightwardly facing shoulder 44 formed on the shaft. This assembly 43 may include spaced rigid typically metal plates 45 and a cushioning ring 46 therebetween formed of rubber or other resiliently deformable material.

In addition to the part 39, latch mechanism 26 includes two similar arms 47 and 48 (FIGS. 3 and 4), which are mounted at diametrically opposite sides of part 39 and axis 21 for swinging movement toward and away from one another about two parallel vertical axes 49 and 50. As seen in FIG. 1, arm 48 is formed of two vertically spaced horizontal plates 51 and 52 rigidly connected together by vertical parallel pins 53 and 54. The pin 54 is received within a vertical bearing 55 attached to housing 31 of the actuator, and is journalled by that bearing for swinging movement with the remainder of arm 48 about vertical axis 50 between the positions of FIGS. 3 and 4. A roller 56 is carried about pin 53 for rotation relative thereto about a vertical axis 57.

The second arm 47 is constructed essentially the same as arm 48, but is the mirror image thereof, and includes two vertically spaced plates corresponding to plates 51 and 52 of arm 48 interconnected by two vertical pins corresponding to pins 53 and 54, one of which is received within a housing carried bearing corresponding to bearing 55 to mount arm 47 for its discussed pivotal movement about axis 49. A roller 58 corresponding to roller 56 is carried by arm 47 for rotation relative thereto about a vertical axis 59 parallel to the axes 49, 50 and 57. As will be apparent from FIGS. 3 and 4, the rollers 56 and 58 are engageable with part 39 carried by shaft 20 at diametrically opposite sides of part 39 and its longitudinal axis 21. Upon rightward movement of shaft 20, the conical surface 41 of part 39 engages rollers 56 and 58 and deflects them laterally apart as part 39 passes the rollers, and until the part 39 reaches its position of FIGS. 1 and 4 in which the rollers are free to return radially inwardly toward one another to cocked positions at the left side of shoulder surface 42, for engagement with that shoulder surface in a manner retaining shaft 20 against leftward movement. Arms 47 and 48 are yieldingly urged toward one another for latching engagement with part 39 by a coil spring 60 which is connected at its opposite ends to arms 47 and 48 and is maintained under tension.

Figures 3, 4, 5, 9:
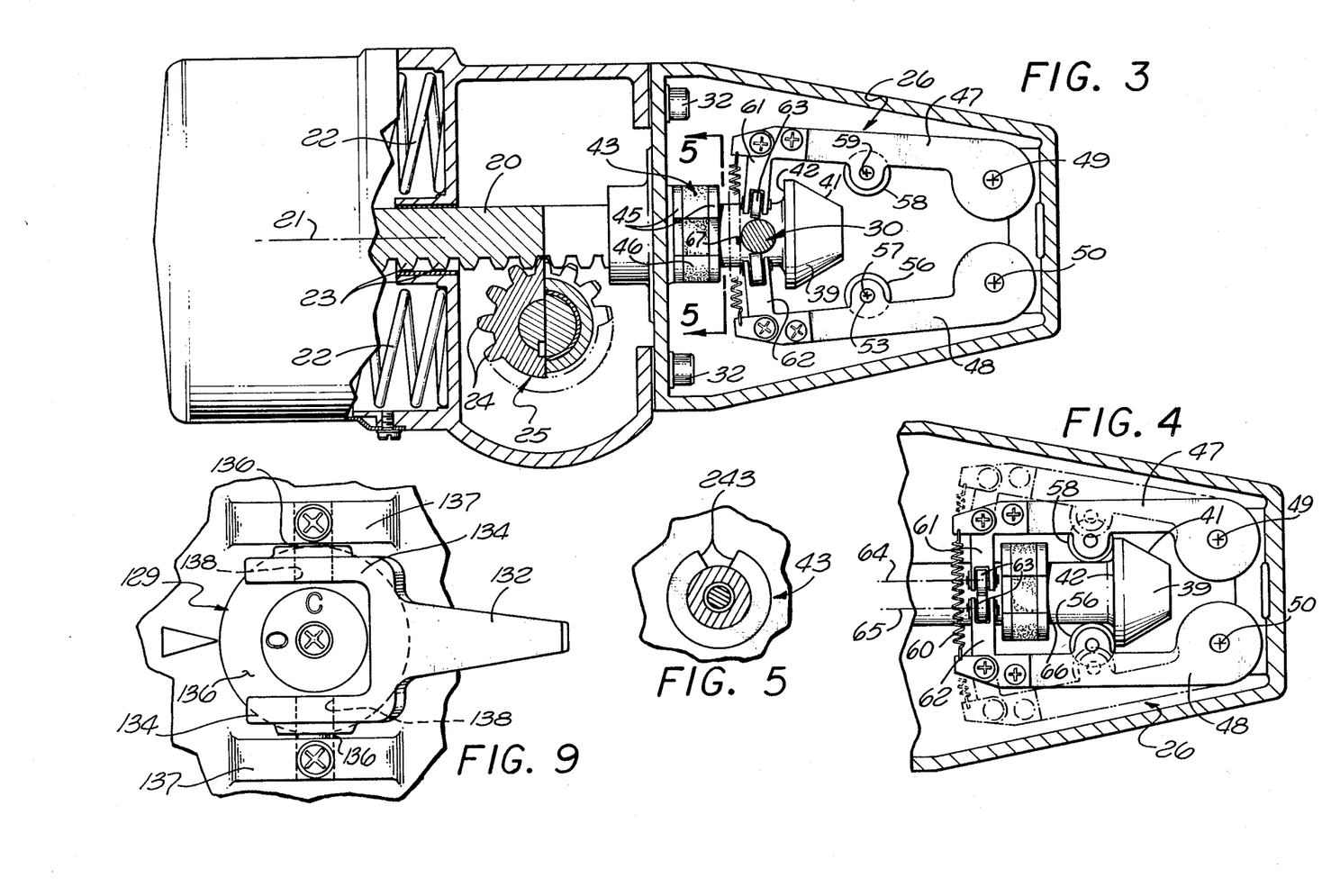
FIG. 3 is a horizontal section taken primarily on line 3—3 of FIG. 2.
FIG. 4 is a fragmentary horizontal section similar to a portion of FIG. 3 but showing the device in cocked open valve condition.
FIG. 5 is a fragmentary vertical section tekn on line 5—5 of FIG. 3.
FIG. 9 is an enlarged fragmentary plan view taken on line 9—9 of FIG. 2.
Figure 7:
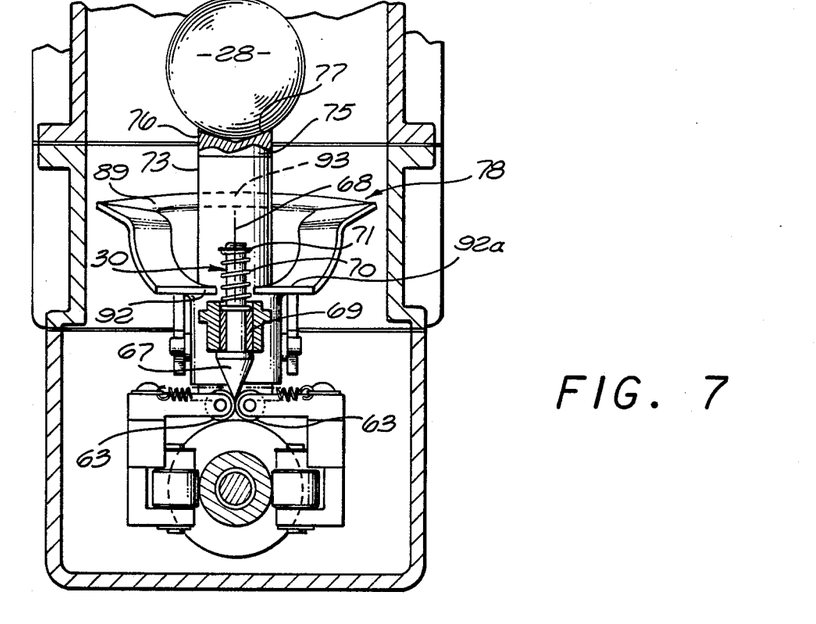
FIGS. 7 and 8 are vertical sections taken on lines 7—7 and 8—8, respectively, of FIG. 6 and both showing the device in the open valve condition of FIG. 1.

At their left ends as viewed in FIGS. 3 and 4, arms 47 and 48 have portions 61 and 62 which project inwardly toward one another at a level above axis 21 (see also FIG. 7), and which carry two additional rollers 63 mounted to portions 61 and 63 for rotation relative thereto about two horizontal axes 64 and 65 which in the FIGS. 1 and 4 condition of the parts are parallel to but at a level above axis 21. When rollers 56 and 58 are in engagement with opposite sides of the cylindrical surface 66 of part 39, the two rollers 63 are preferably in engagement with one another as seen in FIGS. 4 and 7. These rollers are deflectable away from one another by downward movement of the previously mentioned part 30, whose lower conically tapering pointed end 67 forces itself downwardly between rollers 63 and spreads them apart. Part 30 is mounted for vertical movement along a vertical axis 68 between its upper position of FIG. 1 and its lower position illustrated in FIG. 2. Part 30 is journalled for that vertical reciprocating movement by sliding reception within a bushing 69 mounted stationarily to the housing 31 of the device. A coil spring 70 yieldingly urges part 30 upwardly to the FIG. 1 position, and is maintained under compression between the upper end of bushing 79 and a ring 71 carried by and about element 30. As seen in FIG. 5, the elements 45 and 46 of cushion 43 contain a tapered notch 243 at their upper sides to receive the lower end of element 30 in its lowest position and thus allow movement of the cushion axially past element 30 upon movement of rod 20 between its FIG. 1 and FIG. 2 positions.

The support pedestal 29 on which ball 28 is received may be formed integrally with a generally horizontal wall portion 72 of housing 31, and may have an outer cylindrical surface 73 centered about a vertical axis 74. At its upper end, the support pedestal may include a second part 75 rigidly connected to the lower portion of the pedestal and having an outer cylindrical surface 76 which is a continuation of surface 73 and disposed about axis 74. At its upper side, the top section 75 of the pedestal has a slightly concave annular upwardly facing surface 77 centered about axis 74 for receiving the lower portion of ball 28 in a relation retaining the ball on the pedestal unless and until shock forces of a predetermined substantial magnitude are encountered. When such forces occur, the pedestal 73 and its upper member 75 move horizontally with the remainder of the housing, while the inertia of weight 28 tends to retain it against movement with the housing, with the result that upon attainment of a predetermined relative displacement the ball or weight 28 falls downwardly at some location about the periphery of and adjacent to the pedestal.

Figure 6:
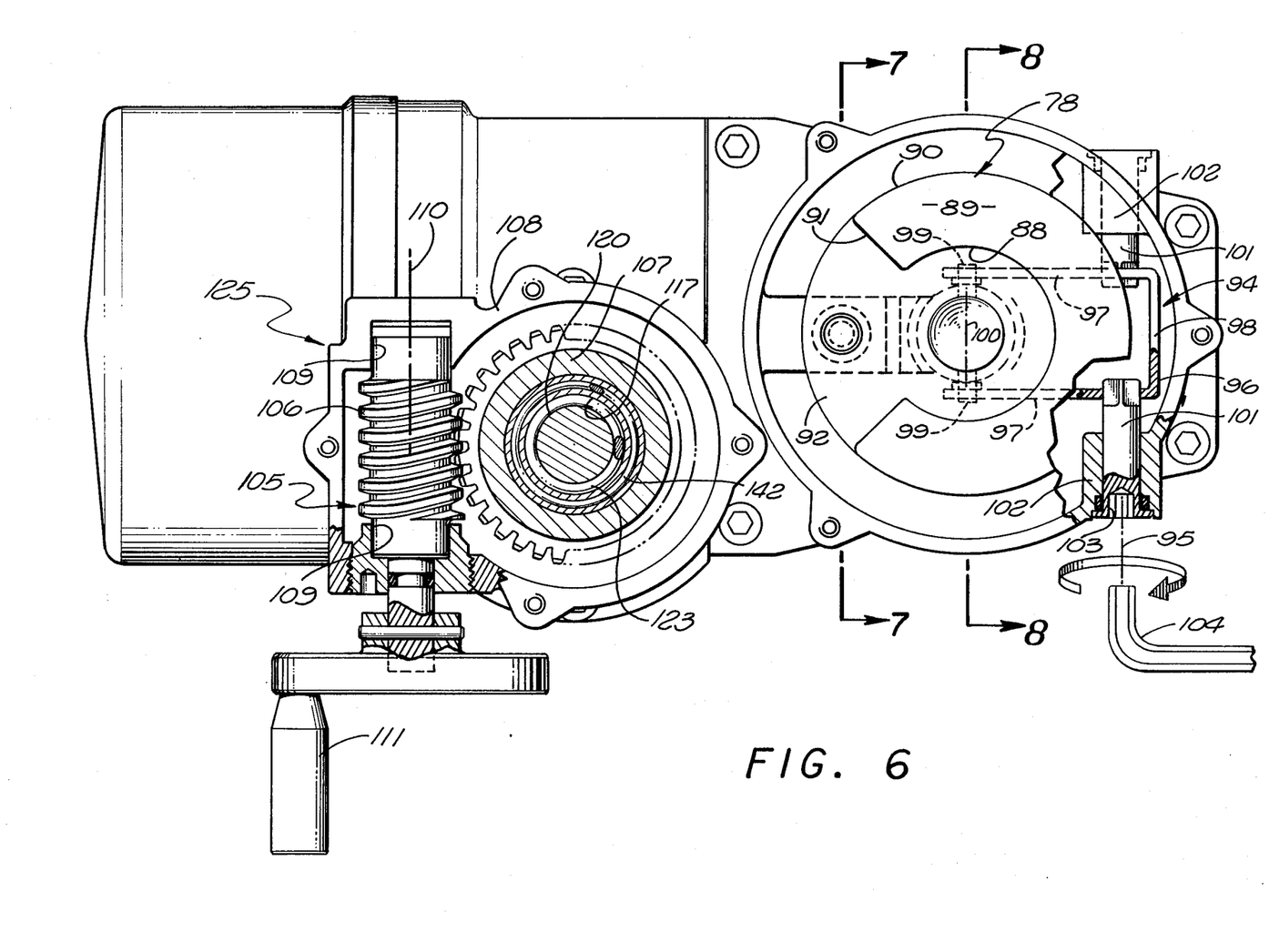
FIG. 6 is an enlarged horizontal section taken on line 6—6 of FIG. 2.

If ball 28 falls downwardly at any location other than directly over the latch releasing element 30, the ball is directed by a guide structure or member 78 circularly about the pedestal to the location of element 30 for actuation thereof. The guide member 78 has a lower cylindrical portion 79 which is a close sliding fit about cylindrical external surfaces 73 and 76 of the pedestal to mount member 78 for upward and downward movement along the pedestal between the full line normal position of FIG. 1 and the broken line resetting position of that figure. In extending upwardly from the upper edge of its tubular portion 79, the wall of guide member 78 extends gradually radially outwardly away from axis 74 as represented at 88 in FIG. 2, and then more abruptly radially outwardly at 89 to a peripheral edge 90. These portions 88 and 89 of guide 78 continue circularly about pedestal 29 through its entire circular extent except at the location of a recess 91 which is formed at the left side of the pedestal as viewed in FIGS. 1 and 6, and thus at the location of the weight actuable element 30. At the underside of and forming that recess 91, the member 78 has a wall 92 which is dimensioned to confine ball 28 directly above element 30 for actuation thereof. At the very bottom of the recess, the wall 92 has a portion extending generally horizontally as illustrated at 92a in FIGS. 1 and 7.

Figure 8:
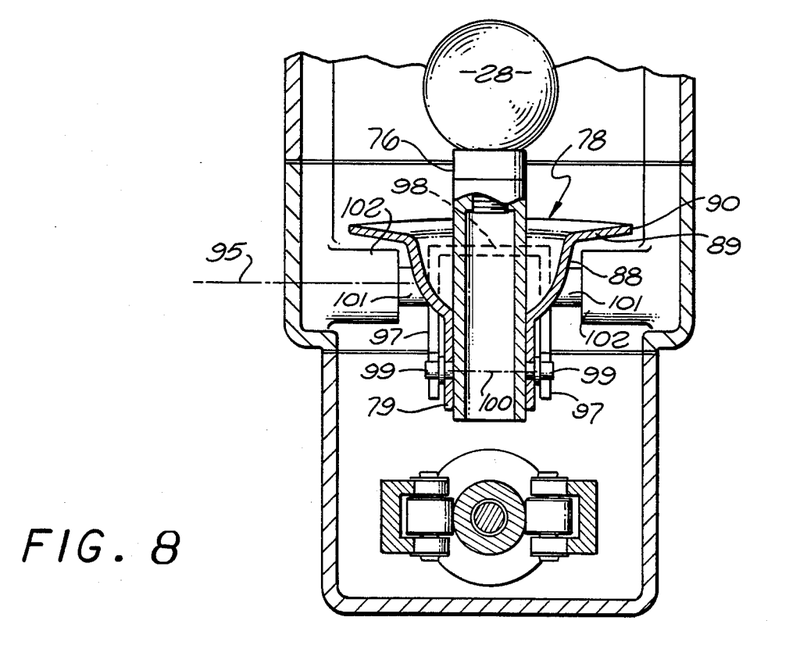

As seen in FIGS. 2, 7 and 8, the upper generally horizontal peripheral portion 89 of member 78 is at its highest elevation at a location 93 diametrically opposite the recess 91, and is inclined to advance gradually downwardly as it advances circularly toward the recess in either circular direction, to thus form a ramp along which ball 28 can roll by gravity toward recess 91 from any location offset circularly from that recess. It is also noted that the peripheral ramp portion 89 of guide 78 is inclined to advance gradually downwardly as it advances radially inwardly toward axis 74, with this being true at all locations along the circular extent of portion 89, to thus maintain weight 28 by gravity inwardly against pedestal 29. Further, at the location of recess 91, the bottom wall 92 and its portion 92a of the recess are inclined to advance gradually downwardly as they advance radially inwardly toward axis 74, to cause the ball at that location to be cammed inwardly by gravity toward the pedestal.

Guide member 78 is manually actuable upwardly from the full line position of FIG. 1 to its broken line position of that figure by a reset mechanism 94 mounted for swinging movement about a horizontal axis 95. Mechanism 94 includes a U-shaped part 96 (FIG. 6) having two parallel arms 97 interconnected by a cross piece 98 and projecting to locations at opposite sides of the tubular lower portion 79 of guide member 78. Two pins 99 aligned with one another along a horizontal axis 100 are carried by tubular portion 79 of member 78 and project in diametrically opposite directions therefrom at locations to be engaged at their undersides by the two arms 97 of part 96, so that as part 96 swings in a clockwise direction as seen in FIG. 1, to the broken line position of that figure, the arms 97 act against pins 99 to urge those pins and the connected member 78 upwardly from the full line position of part 78 to its broken line position. The two arms 97 of member 96 may be connected near the right end of member 96 as viewed in FIG. 1 to a pair of externally cylindrical shafts 101 (FIG. 6) aligned with one another along axis 95 and journalled within two bearings 102 carried by housing 31, to thus mount member 96 and the connected pins for pivotal movement about axis 95. One of the shafts 101 contains at its outer end an allen wrench recess 103 of non-circular cross-section engageable with an allen wrench 104 or other tool to enable manual rotary actuation of member 96 from the outside of housing 31 to raise part 78 as discussed. When member 78 reaches the upper broken line position of FIG. 1 during a resetting operation, the portion 92a of member 78 is at the level of the highest portion of the upper surface 77 of the pedestal, so that a ball resting in recess 91 will roll by gravity rightwardly in FIG. 1 and to the reset position of that figure on the upper end of pedestal 29.

Cocking mechanism 125 includes a manually operated worm gear drive 105 including a worm 106 and an engaging worm gear 107, both located within an upper hollow portion 108 of the housing 31. Worm 106 is journalled within bearing surfaces 109 of the housing (FIG. 6) for rotation about a horizontal axis 110 by a crank arm 111 accessible for operation by a user from the exterior of the housing. Worm gear 107 has external cylindrical surfaces 112 and 113 (FIG. 10) journalled within portions 114 and 115 of the housing to mount the worm gear for rotation relative to the housing about axis 15. Internally, the worm gear 107 which functions as a cocking part has an inner straight cylindrical surface 117 extending between the locations 118 and 119 of FIG. 10, and received directly radially opposite an external straight cylindrical surface 120 formed on vertical shaft 17. At its lower end, worm gear 107 has an internal annular flange 121, containing a vertical passage 122.

A coil spring one way clutch element 123 is received radially between surfaces 117 and 120, in contact with surface 117 and normally retained by its resilience at an internal diameter very slightly greater than the external diameter of surface 120 on the shaft. The lower end of spring 123 is turned to extend directly downwardly at 223, parallel to axis 15, and is received within axial passage 122 in the lower flange portion 121 of worm gear 107 to connect the lower end of the spring to the worm gear for rotation therewith. The remainder of the spring including its upper extremity 124 is not attached directly to either the worm gear 107 or shaft 17. The wire of which spring 123 is formed is desirably of uniform circular cross-section, as shown, except at the upper extremity 124 at which the spring is ground off to have an upper planar horizontal end surface 125. Directly above this surface 125, there is provided within the cylindrical bore 117 of worm gear 107 an annular flat washer 126 engageable at its underside with surface 125 of the spring and at its upper side with a downwardly facing horizontal planar annular surface 127 formed on an annular portion 128 of a pressure member 129 carrying an O-ring 130 engaging a cylindrical internal surface 131 formed in the housing. Member 129 and the engaged washer 126 are actuable downwardly to compress spring 123 axially by swinging movement of an operating lever 132 (FIGS. 9 and 10) about a horizontal axis 133. Lever 132 has at its lower end two arms 134 with similar camming surfaces 135 positioned to engage the upper horizontal annular surface 136 of member 129, to cam member 129 downwardly upon swinging movement of lever 132 from the broken line position of FIG. 10 to its full line position. Lever 132 is mounted for its swinging movement by two pins 136 which are carried by two upwardly projecting ears 137 formed on the housing and which extend into aligned bores or passages 138 in the two arms 134 of lever 132 to locate the lever for only pivotal movement.

To describe a cycle of operation of the above discussed shock responsive valve actuator, assume that shaft 20 is initially in the position of FIG. 2, in which valve 11 is maintained in closed condition by springs 22. Assume also that ball 28 has fallen from pedestal 29 and is in recess 91 of guide member 78, with resultant downward deflection of element 30. To set the apparatus for automatic operation, a user first inserts allen wrench 104 into socket recess 103 (FIG. 6), and then turns the allen wrench in a direction to swing element 94 upwardly from its full line position of FIG. 1 to its broken line position of that figure. This raises pins 99 and the connected guide member 78, with ball 28 supported thereby, upwardly to the broken line position of member 78 in horizontal alignment with the highest portion of the upper surface 77 of pedestal 29. The ball 28 contained in recess 91 is correspondingly raised and ultimately rolls rightwardly along portion 92a of member 78 and onto the upper slightly concave surface 77 of the pedestal. The ball will remain in that set position as the operator allows member 78 to return downwardly to its full line position of FIG. 1. The operator can visually determine when the ball is in proper position on the pedestal by viewing the ball through a top transparent window 138 carried in the upper end of the housing.

Figures 10, 11:
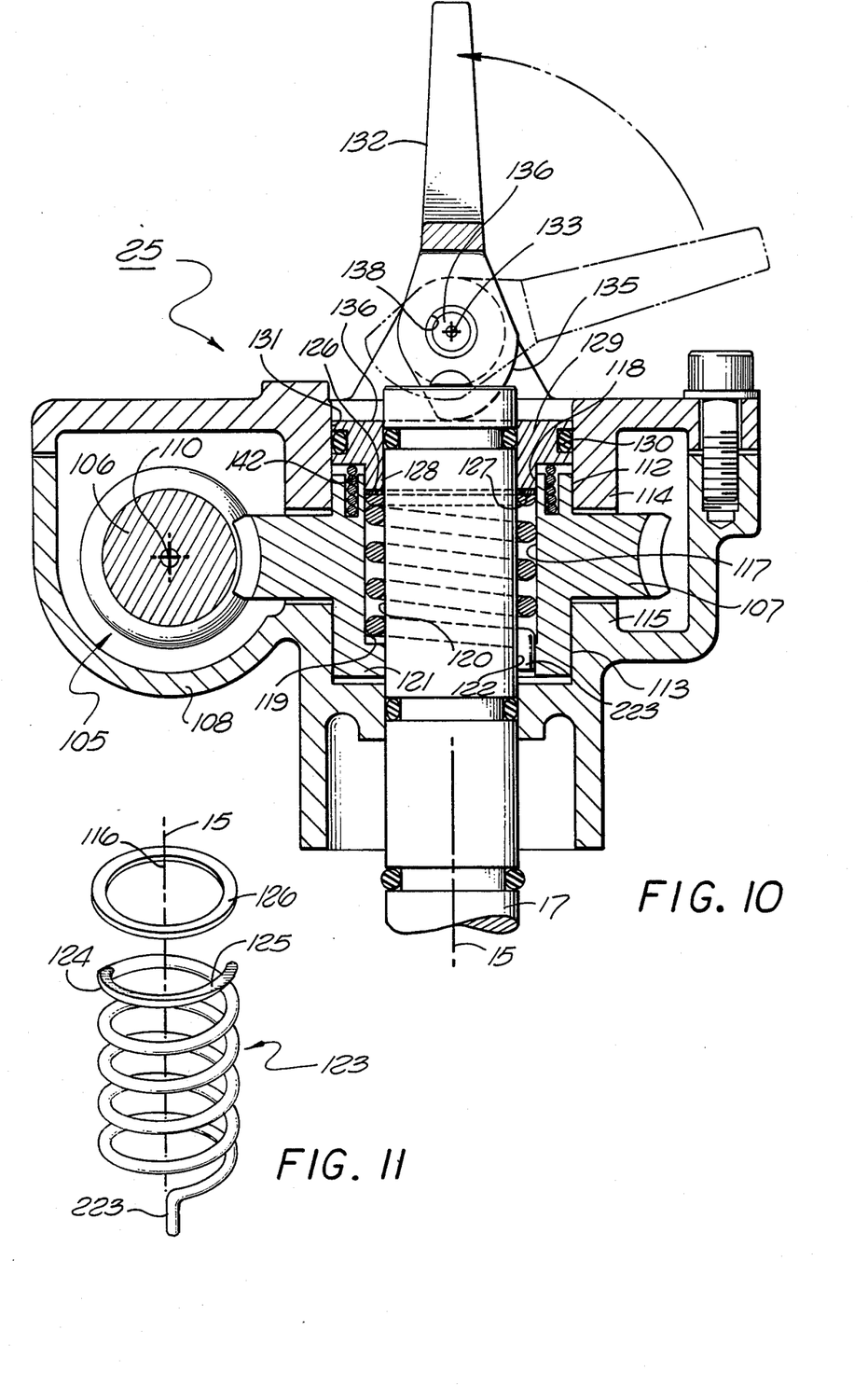
FIG. 10 is an enlarged vertical section corresponding to a portion of FIG. 2 but showing the device in condition for the manual resetting of the valve to open condition.
FIG. 11 is an exploded perspective view of the clutch spring and washer of FIG. 10.

After the ball has been located on the pedestal, and guide member 78 has been returned downwardly to its full line position of FIG. 1, the operator swings control lever 132 from its broken line position of FIG. 10 to its full line position of that figure, and as a result of that swinging movement camming surfaces 135 act to force elements 129 and 127 downwardly against the upper end of spring 123, to thus compress the spring axially. With lever 132 in this condition holding washer 126 tightly against the upper end of clutch spring 123, the operator turns crank handle 111 and the connected worm 106 in a counterclockwise direction as viewed in FIG. 10, producing clockwise rotation of worm gear 107 as viewed in FIG. 6. The lower end 223 of clutch spring 123 rotates in that clockwise direction with the worm gear by virtue of its interfitting engagement therewith, and by virtue of that rotation tends to cause spring 123 to wrap tightly about the outer cylindrical surface 120 of shaft 17. The downward force exerted by washer 126 against the upper end of clutch spring 123 causes the washer to frictionally resist rotation of the upper extremity of the spring, thus enhancing the wrapping action of the spring on shaft 17, and assuring rotation of the shaft by the worm gear and spring. In this connection, it is noted that the clutch spring 123 is wound in the manner illustrated in FIG. 11, with the spring advancing in a counterclockwise direction (looking downwardly) as the spring extends helically upwardly from its lower end 223 toward its upper end. The direction of helical advancement of the spring is thus predetermined to attain the discussed wrapping action on the shaft contained in the spring. As the operator acts through the worm gear drive and clutch spring 123 to rotate shaft 17 in a clockwise direction (looking downwardly), the pinion gear 25 on shaft 17 acts by virtue of its engagement with rack teeth 23 to force shaft or rod 20 rightwardly as viewed in the figures to the cocked position of FIG. 1, and against the resistance offered by springs 22. During such rightward movement of shaft 20, the latching part 39 deflects rollers 56 and 58 and their attached arms 48 and 47 relatively apart as previously discussed, with those rollers and arms ultimately returning radially inwardly under the influence of spring 60 for engagement with transverse surface 42 at the left side of latch part 39 to hold shaft 20 in the cocked position of FIG. 1. In that position, valve 11 is retained in open condition by the latching mechanism 26. The operator then swings lever 132 from the full line position of FIG. 10 to its broken line position of that figure, to release the camming force exerted by surfaces 135 on part 129, and allow that part 129 to be returned upwardly by a plurality of springs 142 contained within upper recesses in worm gear 107 and bearing upwardly against part 129. Springs 142 hold part 129 upwardly in a position in which the clutch spring 123 is allowed to return by its own resilience to its normal free position. In that condition, the internal diameter of spring 123 is very slightly greater than the external diameter of surface 120 on shaft 117, and thus the shaft is completely free for automatic valve closing rotation in response to earthquake forces.

When shock forces of a predetermined magnitude are encountered, those forces displace ball 28 laterally off of the concave surface 77 of pedestal 29, to fall downwardly at a side of the pedestal, and then be directed by guide member 78 by gravity circularly about the pedestal and into the recess 91 in member 78. As the ball falls downwardly in that recess, it contacts the upper end of pin 30, and deflects that pin downwardly so that its lower pointed end moves between rollers 63 and forces them apart to correspondingly swing arms 47 and 48 and their carried rollers 58 and 56 laterally apart far enough to release latch part 39 and the attached shaft 20 for leftward movement as viewed in FIG. 1 under the influence of springs 22 and to the position of FIG. 2.

During such longitudinal movement of the shaft 20, rack teeth 23 cause rotation of gear 25 and the connected vertical shaft 17 and valve 13 in a counterclockwise direction (looking downwardly) and to a position in which valve 13 is closed.

While a certain specific embodiment of the present invention has been disclosed as typical, the invention is of course not limited to this particular form, but rather is applicable broadly to all such variations as fall within the scope of the appended claims.

I claim:

1. A shock responsive device comprising:
   a support having an upper surface;
   a weight supported on said surface and adapted to be displaced relative to the support by shock forces and fall downwardly therefrom;
   an element actuable by said weight at a first side of the support;
   means responsive to actuation of said element by said weight to operate a controlled unit; and
   a guide structure onto which said weight can fall at a second side of the support and which is constructed to direct the weight from said second side of the support to said first side for actuation of said element and said controlled unit;
   said element being movable downwardly relative to said guide structure by said weight.

2. A shock responsive device as recited in claim 1, in which said structure includes a ramp for supporting said weight and which is inclined to direct the weight by gravity from said second side of the support to said first side.

3. A shock responsive device as recited in claim 1, in which said structure includes a ramp extending essentially circularly about said support and inclined to advance progressively downwardly toward said first side of the support to direct the weight by gravity to said first side of the support from any other location about the support.

4. A shock responsive device as recited in claim 1, in which said means include a part for actuating said unit and which is yieldingly urged in a predetermined direction, and latch means for releasably retaining said part against movement in said predetermined direction and adapted to be released by said element upon actuation thereof by said weight.

5. A shock responsive device as recited in claim 1, including means yieldingly urging said element upwardly relative to the guide structure.

6. A shock responsive device as recited in claim 1, in which said structure has a surface for supporting said weight and which is inclined to advance downwardly as it advances radially inwardly toward the support.

7. A shock responsive device as recited in claim 1, in which said support is a pedestal, and said structure has an upper surface extending essentially circularly about said pedestal for supporting said weight and which is inclined to advance progressively downwardly as it advances circularly toward said first side of the pedestal, and substantially entirely about the pedestal is also inclined to advance progressively downwardly as said surface of the guide structure advances radially inwardly toward the pedestal.

8. A shock responsive device as recited in claim 1, including means forming a surface at said first side of the support for supporting said weight and which is actuable upwardly relative to the support and relative to said element to return the weight to said upper surface of the support.

9. A shock responsive device as recited in claim 1, including means forming a surface for supporting said weight at said first side of the support and which is movable upwardly relative to the support and relative to said element to return the weight to the upper surface of the support, and is also inclined to advance gradually downwardly as it advances radially inwardly for movement of the weight by gravity onto the upper surface of the support.

10. A shock responsive device as recited in claim 1, in which said support is a pedestal and said guide structure contains a recess for receiving and holding said weight at said first side of the pedestal at a location for actuation of said element, and has a ramp surface extending essentially circularly about the pedestal and which is inclined to direct the weight by gravity to said recess from any location about the pedestal.

11. A shock responsive device comprising:
    an actuator part operable upon movement in a predetermined direction to operate a controlled unit;
    means yieldingly urging said part in said predetermined direction;
    latch mechanism for holding said part against movement in said predetermined direction and which includes an element operable by generally horizontal displacement to release the latch mechanism;
    a support;
    a weight positioned on said support and displaceable by shock forces to fall downwardly from the support;
    a member positioned to be moved downwardly by said weight as the weight falls from said support; and
    interengaging cam surfaces on said member and said element acting upon downward movement of said member by said weight to cam said element generally horizontally and thereby release said latch mechanism.

12. A shock responsive device as recited in claim 11, in which said member is movable downwardly along an axis, with said cam surfaces on the member being disposed at an oblique angle to said axis.

13. A shock responsive device comprising:
    an actuator part operable upon movement in a predetermined direction to actuate a controlled unit;
    means yieldingly urging said part in said direction;
    two latching structures engageable with opposite sides of said part in holding relation to retain it against movement in said direction and which are operable by movement in generally opposite generally horizontal directions away from one another to release the part for movement in said predetermined direction;
    a support;
    a weight on said support displaceable relative thereto by shock forces to fall downwardly from the support;
    a member positioned to be moved downwardly by said weight as the weight falls from said support; and
    interengaging camming surfaces on said member and said two latching structures acting to cam said structures in said generally opposite generally horizontal directions away from one another by downward movement of said member to release said part for movement in said predetermined direction.

14. A shock responsive device as recited in claim 13, in which said two latching structures include arms mounted for swinging movement by said member generally horizontally toward and away from one another.

15. A shock responsive device as recited in claim 13, in which said two latching structures have rollers opposite one another which act upon movement relatively apart to release said part for movement in said predetermined direction, said member having a portion displaceable downwardly between said rollers by said weight, said camming surfaces being formed on said rollers and on said portion of said member to cam the latching structures apart upon downward movement of said portion of the member between the rollers.

16. A shock responsive device as recited in claim 13, in which said latching structures include two arms mounted for swinging movement generally horizontally toward and away from one another and received at opposite sides of said actuator part, there being a first pair of rollers carried by said arms for engaging shoulder means on said part to retain it against movement in said direction, and a second pair of rollers carried by said arms for swinging movement therewith, said member having a lower tapered end receivable between said second pair of rollers upon downward movement of said member, said interengaging camming surfaces being formed on said second pair of rollers and said lower tapered end of said member to displace said second pair of rollers relatively horizontally apart and thereby swing said two arms apart to release said actuator part for movement in said predetermined direction.

17. A shock responsive device comprising:
an actuator shaft operable upon rotation in a first direction about an axis to actuate a controlled unit;
means yieldingly urging said shaft in said first rotary direction;
latch means for releasably holding said shaft against rotation in said first direction;
shock responsive means for automatically releasing said latch means upon subjection to shock forces;
a manually rotatable cocking member disposed about said shaft for turning the shaft in a direction the opposite of said first direction; and
a coil spring disposed about said shaft and having a first end connected to said cocking member for rotation therewith about said axis and a second free end not directly connected to said cocking member;
said coil spring being adapted to wrap tightly about said shaft upon rotary motion of said cocking member in said opposite direction, to transmit rotation in said opposite direction from the cocking member to the shaft, but being releasable from tight engagement with the shaft to permit rotation of the shaft in said first direction relative to the cocking member.

18. A shock responsive device as recited in claim 17, including means for applying force to said coil spring in a relation assuring transmission of rotation from said cocking member to the shaft in said opposite direction, and operable to release said force for rotation of the shaft in said first direction.

19. A shock responsive device as recited in claim 17, including means for applying axial compressive force to said second end of the spring to assure transmission of rotary cocking motion in said opposite direction from the cocking member to the shaft, and adapted to release said force for free rotation of the shaft in said first direction.

20. A shock responsive device as recited in claim 17, in which said actuator shaft and said cocking member have cylindrical outer and inner surfaces respectively spaced radially apart and between which said coil spring is received in closely confined relation.

21. A shock responsive device as recited in claim 17, including a handle for manually actuating said cocking member, and a worm gear drive between said handle and the cocking member enabling rotation of the cocking member by the handle but preventing rotation of the handle by the cocking member.

22. A shock responsive device as recited in claim 17, including a manually actuable part for releasably applying axial compressive force to the coil spring.

23. A shock responsive device as recited in claim 17, including a part for applying axial compressive force to said second end of said spring, and a manually actuable swinging arm operable upon swinging movement to cam said part axially to compress the coil spring for transmission of cocking motion from the cocking member to the shaft.

24. A shock responsive device as recited in claim 17, in which said actuator shaft has an outer cylindrical surface centered about said axis, and said cocking member has an inner cylindrical surface centered about said axis and spaced radially from said outer surface of the shaft, said coil spring being received radially between said outer surface of the shaft and said inner surface of the cocking member and being confined closely between said surfaces of the shaft and cocking member for engagement therewith, there being a compressing part disposed essentially annularly about said shaft and engageable with said second end of said spring to apply axial compressive force thereto, and a manually actuable arm mounted for swinging movement and having a camming portion for applying axial force to said compressing part to compress the spring for frictionally gripping said outer surface of the shaft and transmitting rotary motion from the cocking member to the shaft.

25. A shock responsive device as recited in claim 24, including a worm gear connected to said cocking member for rotating it, a worm engaging the worm gear for driving it, and a manually operated handle for turning the worm.

26. A shock responsive device comprising:
a rod which is movable along an axis;
means yieldingly urging said rod in a predetermined direction along said axis;
latch mechanism for releasably retaining said rod against movement in said direction;
a support;
a weight on said support and which is displaceable relative thereto by shock forces and is operable to release said latch mechanism upon such shock induced displacement;
a toothed rack carried by said rod for movement therewith;
a gear rotatable by said rack upon movement of said rod in said predetermined direction; and
an actuator shaft connected to said gear for rotation therewith and operable to actuate a controlled unit upon such rotation.

27. A shock responsive device as recited in claim 26, including a manually rotatable cocking member disposed about said shaft for turning the shaft in a direction the opposite of the direction it turns when said rod moves in said predetermined direction, a coil spring disposed about said shaft and within said cocking member, and manually operable means for compressing said coil spring.

28. A shock responsive device as recited in claim 27, including a worm gear connected to said cocking member for rotation therewith, a worm engaging the worm gear to drive it, and a handle for rotating said worm.

29. A shock responsive device as recited in claim 28, in which said support is a pedestal having an upper surface on which said weight is received and from which the weight is displaceable by shock forces to fall downwardly at any of different sides of the pedestal, there being an element actuable downwardly by said weight at a first side of the pedestal and operable upon such downward actuation to release said latch mechanism, means yieldingly urging said element upwardly, and a guide structure disposed about said pedestal and having an upper guide surface extending essentially circularly about said pedestal and engageable by said weight to direct the weight to said first side of the pedestal from any other location about the pedestal, said guide surface of said guide structure being inclined toward said first side to direct the weight thereto by gravity, said guide structure having a recess at said first side of the pedestal into which the weight can fall from said guide surface to a location at which the weight engages said element and deflects it downwardly to release the latch mechanism.

30. A shock responsive device as recited in claim 29, in which said guide structure has a sleeve portion disposed about said pedestal and guided for generally vertical movement relative thereto between a lower position in which the weight can engage and actuate said element and an upper position in which the weight can move by gravity from said recess in the guide structure onto said upper surface of the pedestal to reset the device, said guide structure having an inclined surface at the location of said recess which advances progressively downwardly as it advances radially toward the pedestal to effect said movement of the weight by gravity onto the pedestal.

31. A shock responsive device comprising:
a support having an upper surface;
a weight supported on said surface and adapted to be displaced relative to the support by shock forces and fall downwardly therefrom;
an element actuable by said weight at a first side of the support;
means responsive to actuation of said element by said weight to operate a controlled unit; and
a guide structure onto which said weight can fall at a second side of the support and which is constructed to direct the weight from said second side of the support to said first side for actuation of said element and said controlled unit;
said guide structure being movable upwardly and downwardly relative to said support, and being operable by upward movement to raise said weight and replace it on the support for resetting the device.

32. A shock responsive device as recited in claim 31, including means for manually actuating said guide structure upwardly relative to the support to reset the device.

33. A shock responsive device comprising:
a support havimg an upper surface;
a weight supported on said surface and adapted to be displaced relative to the support by shock forces and fall downwardly therefrom;
an element actuable by said weight at a first side of the support;
means responsive to actuation of said element by said weight to operate a controlled unit; and
a guide structure onto which said weight can fall at a second side of the support and which is constructed to direct the weight from said second side of the support to said first side for actuation of said element and said controlled unit;
said support being a pedestal;
said guide structure being disposed about said pedestal and guided thereby for upward and downward movement relative thereto to return the weight upwardly onto the pedestal in resetting the device.

34. A shock responsive device comprising:
a support having an upper surface;
a weight supported on said surface and adapted to be displaced relative to the support by shock forces and fall downwardly therefrom;
an element actuable by said weight at a first side of the support;
means responsive to actuation of said element by said weight to operate a controlled unit; and
a guide structure onto which said weight can fall at a second side of the support and which is constructed to direct the weight from said second side of the support to said first side for actuation of said element and said controlled unit;
said guide structure being movable upwardly relative to said support to return the weight to said upper surface of the support, and having a surface at said first side of the support inclined radially inwardly toward the support to direct the weight by gravity onto the upper surface of the support.

35. A shock responsive device comprising:
a support having an upper surface;
a weight supported on said surface and adapted to be displaced relative to the support by shock forces and fall downwardly therefrom;
an element actuable by said weight at a first side of the support;
means responsive to actuation of said element by said weight to operate a controlled unit; and
a guide structure onto which said weight can fall at a secomd side of the support and which is constructed to direct the weight from said second side of the support to said first side for actuation of said element and said controlled unit;
said support being a pedestal;
said guide structure containing a recess for receiving and holding said weight at said first side of the pedestal at a location for actuation of said element, and having a ramp surface extending essentially circularly about the pedestal and which is inclined to direct the weight by gravity to said recess from any location about the pedestal;
said element extending upwardly through an opening in said guide structure at the location of said recess and being movable downwardly relative to the structure by said weight when it falls into said recess.

36. A shock responsive device as recited in claim 35, including means guiding said structure for upward and downward movement relative to said pedestal to return the weight upwardly onto the upper surface of the pedestal.

37. A shock responsive device comprising:
a support having an upper surface;

a weight supported on said surface and adapted to be displaced relative to the support by shock forces and fall downwardly therefrom;

an element actuable by said weight at a first side of the support;

means responsive to actuation of said element by said weight to operate a controlled unit; and a guide structure onto which said weight can fall at a second side of the support and which is constructed to direct the weight from said second side of the support to said first side for actuation of said element and said controlled unit;

said support being a pedestal;

said guide structure having a tubular sleeve portion received slidably about the pedestal and guided thereby for upward and downward movement relative to the pedestal between a lower position and an upper reset position in which the weight is returned from said structure to said upper surface of the pedestal;

said guide structure having an upper guide surface which extends essentially circularly about the pedestal and which is inclined to advance progressively downwardly as it advances circularly about the pedestal toward said first side thereof, and is also inclined to advance progressively downwardly as it advances radially inwardly toward the pedestal;

said guide structure having a recess at said first side of the pedestal into which said weight can fall for actuation of said element;

said guide structure forming a bottom wall of said recess which supports said weight and from which the weight can move onto the upper surface of the pedestal in said upper position of the guide structure, and which surface of the recess is inclined to advance progressively downwardly as it advances radially inwardly for movement of the weight by gravity onto the pedestal.

38. A shock responsive device as recited in claim 37, in which said element projects upwardly through an opening in said structure at the bottom of said recess and is movable downwardly by said weight, there being means yieldingly urging said element upwardly relative to said structure, and means for manually actuating said guide structure upwardly to reset the device.

39. A shock responsive device as recited in claim 38, in which said responsive means includes an actuator part for operating said controlled unit and which is guided for movement generally horizontally along an axis, spring means for yieldingly urging said part in a predetermined axial direction, and latch means for releasably retaining said part against movement in said predetermined direction and adapted to be released by downward movement of said element by the weight.

* * * * *